United States Patent [19]

Nelson

[11] 4,196,318
[45] Apr. 1, 1980

[54] ELECTRONICALLY-SWITCHED MULTIFREQUENCY GENERATOR FOR PROVIDING TONE SIGNALING

[75] Inventor: Dale H. Nelson, Cumberland, Ind.

[73] Assignee: Bell Telephone Laboratories, Incorporated, Murray Hill, N.J.

[21] Appl. No.: 947,019

[22] Filed: Sep. 29, 1978

[51] Int. Cl.² ............................................. H04M 1/50
[52] U.S. Cl. ............................................. 179/84 VF
[58] Field of Search .............. 179/81 R, 84 R, 84 VF, 179/90 K, 16 F

[56] References Cited

U.S. PATENT DOCUMENTS

| 3,525,819 | 8/1970 | Jackson | 179/84 VF |
| 3,544,731 | 12/1970 | Cowpland | 179/84 VF |
| 3,978,295 | 8/1976 | van der Plaats | 179/84 VF |
| 4,061,886 | 12/1977 | Callahan | 179/84 VF |

OTHER PUBLICATIONS

American Microsystems, Inc., S2559 Digital Tone Generator, pp. 1-12, Jun. 1977.

Primary Examiner—James W. Moffitt
Assistant Examiner—Joseph A. Popek
Attorney, Agent, or Firm—Harry L. Newman

[57] ABSTRACT

In a multifrequency generator providing tone signaling for a telephone, the common switch functions are performed by solid-state switching circuitry (12). The dc drive current level to the solid-state switching circuitry varies with the loop length of the telephone line such that saturation of switching transistors (405, 409, 410, 508 and 518) contained therein will be maintained on longer loops even with the corresponding decrease in operating current available from a central office. In the speech mode, the appropriate switching transistors are driven with a a high impedance current sources (505-507 and 514-517) thereby preventing an unacceptable shunt degradation of the speech signals. Similarly, in the dial mode, a high impedance current sink (406 and 407) drives the appropriate switching transistors, thus preventing shunt degradation of the tone signals.

18 Claims, 7 Drawing Figures

ELECTRONICALLY-SWITCHED MULTIFREQUENCY GENERATOR FOR PROVIDING TONE SIGNALING

TECHNICAL FIELD

This invention relates to multifrequency signal generators that provide tone signaling and, more particularly, to common switching circuitry and logic control circuitry of such generators.

BACKGROUND OF THE INVENTION

Multifrequency generators with the capability of producing unique coincident pairs of oscillatory signal bursts in response to an input signal or in response to the actuation of a switch or the like, are well known as disclosed, for example, by L. A. Meacham and F. West in U.S. Pat. No. 3,184,554, issued May 18, 1965. One form of the arrangement shown by Meacham and West is presently employed commercially as a pushbutton-operated dial for a telephone set. The dial employs mechanical contact switches to disable the transmitter, attenuate the receiver and apply power to start the multifrequency generator to producing the oscillatory signal pair.

One of the difficulties encountered with the mechanical contact switches is that the contacts while in the open position allow airborne particulate matter to deposit on the contact surfaces. The contact resistance of the switch thus becomes excessively large adversely affecting the performance of the generator. Another problem stems from the use of pushbutton-operated telephone dials in data entry applications, such as dial-up credit authorization and verification operations. In such use, the need for a dial capable of withstanding millions of button operations without degradation of performance or operational failures is readily apparent.

With the advent of integrated circuitry and thin film techniques has come the realization that such modern circuit technology can be readily exploited in conventional multifrequency signal generators replacing mechanical switches with electrical switches. For example, in U.S. Pat. No. 3,525,819, issued to R. G. Jackson on Aug. 25, 1970, an electronic common switch which replaces the mechanical switching functions of disabling the transmitter and attenuating the receiver id disclosed. The electronic switching is achieved therein by combining solid-state circuit elements with a piezoelectric device which, when physical force is applied thereupon, generates a control voltage that is applied to switching transistors. Another example in which an electronic switch is used to directly replace a mechanical switch is disclosed in U.S. Pat. No. 3,544,731, issued to M. C. J. Cowpland on Dec. 1, 1970. The electronic switch is operably combined with an existing oscillator circuit which is used to generate dial signals. Although avoiding the problem of a high failure rate attributed to mechanical switches, these electronic switches tend to degrade the transmission performance on long loops with corresponding low loop current because of the shunting effect the control voltage circuitry places across the telephone line. In addition, because the prior art using common electronic switching arrangements attenuate the receiver and generate the oscillator signal bursts simultaneously, loud annoying clicks may occur in the receiver of the associated telephone set.

SUMMARY OF THE INVENTION

In the signal generator of the present invention, the use of mechanical contacts is avoided by using all solid-state switching circuitry with the exception of a keypad which makes only one contact per button. The solid-state switching circuitry employs switching devices, such as transistors, for providing a means of attenuating the receiver, disabling the transmitter, providing power to the tone generator, and commencing tone generation. These common switching functions are activated by depressing any one of the array of buttons on the keypad.

To avoid the transmission degradation of the signal caused by the shunting effect of control voltage circuitry placed across the line, high impedance current sources, such as current mirrors, are used to force the switching transistors into saturation. Because of the high impedance presented across the line through use of these current sources, the current consumed is but a small fraction of an available loop current provided from a source such as a central office; thus, a significant power savings is obtained. This, in turn, allows for longer loop lengths while maintaining saturated switching of the switch transistors.

In accordance with the invention, a control circuit interrogates the keypad to determine if a contact has been operated. Upon the sensing of a contact closure, the control circuit provides sequenced information to control the common switching functions and selects the appropriate tone pair via electronic switches connected to a tone generator circuit. For button pushes of less than 50 milliseconds the control circuit will cause the generator circuit to generate tone for a minimum of 50 milliseconds. To avoid undesirable clicks in the receiver of an associated telephone set, the common switching functions are sequenced such that for tone generation, the receiver output is attenuated before the transmitter input is disabled and tone generation is commenced. With the cessation of tone generation, the sequencing is reversed in that the transmitter is restored to its active state and then the receiver is restored.

DETAILED DESCRIPTION

Figure 1:
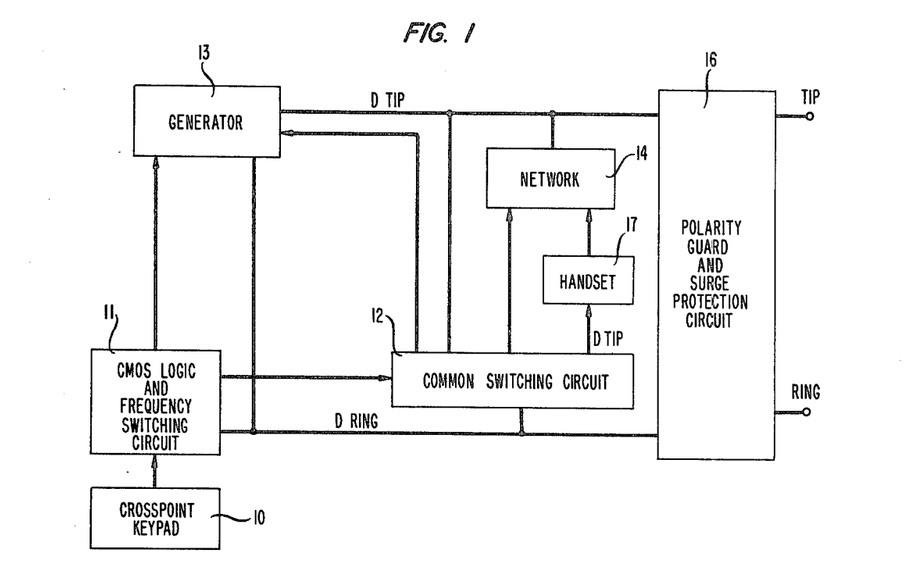
FIG. 1 shows a block diagram of an electronically-switched multifrequency generator in a telephone system in accordance with the present invention.

Referring now to FIG. 1 of the drawing, in accordance with the present invention there is shown a block diagram of an electronically-switched multifrequency generator in a telephone. In the operation of the generator, a crosspoint keypad 10 provided with a semisealed click disc contact array drives a complementary metal oxide semiconductor (CMOS) logic and frequency switching circuit 11. Because of its high input impedance, the CMOS logic and frequency switching circuit 11 is very tolerant of contact resistance. The CMOS logic and frequency switching circuit 11 provides sequenced information to control a common switching circuit 12 and selects the appropriate tone-pair via internal electronic switches that connect to a tone generator 13. The common switching circuit 12 uses the information generated by the CMOS logic and frequency switching circuit to disable a transmitter and attenuate a receiver found in a handset 17, provide power to the tone generator 13, and initiate tone generation in the tone generator 13. Connected across the telephone's tip line and via the common switching circuit to the telephone's ring line, is a network 14 that couples speech signals to and from the handset 17. A polarity guard and surge protection circuit 16 ensures that the correct polarity is maintained on the electronics irrespective of the voltage polarity present on the tip and ring lines and that no high voltage surge is allowed to be impressed on the circuitry thereby damaging the electronics.

Figure 2:
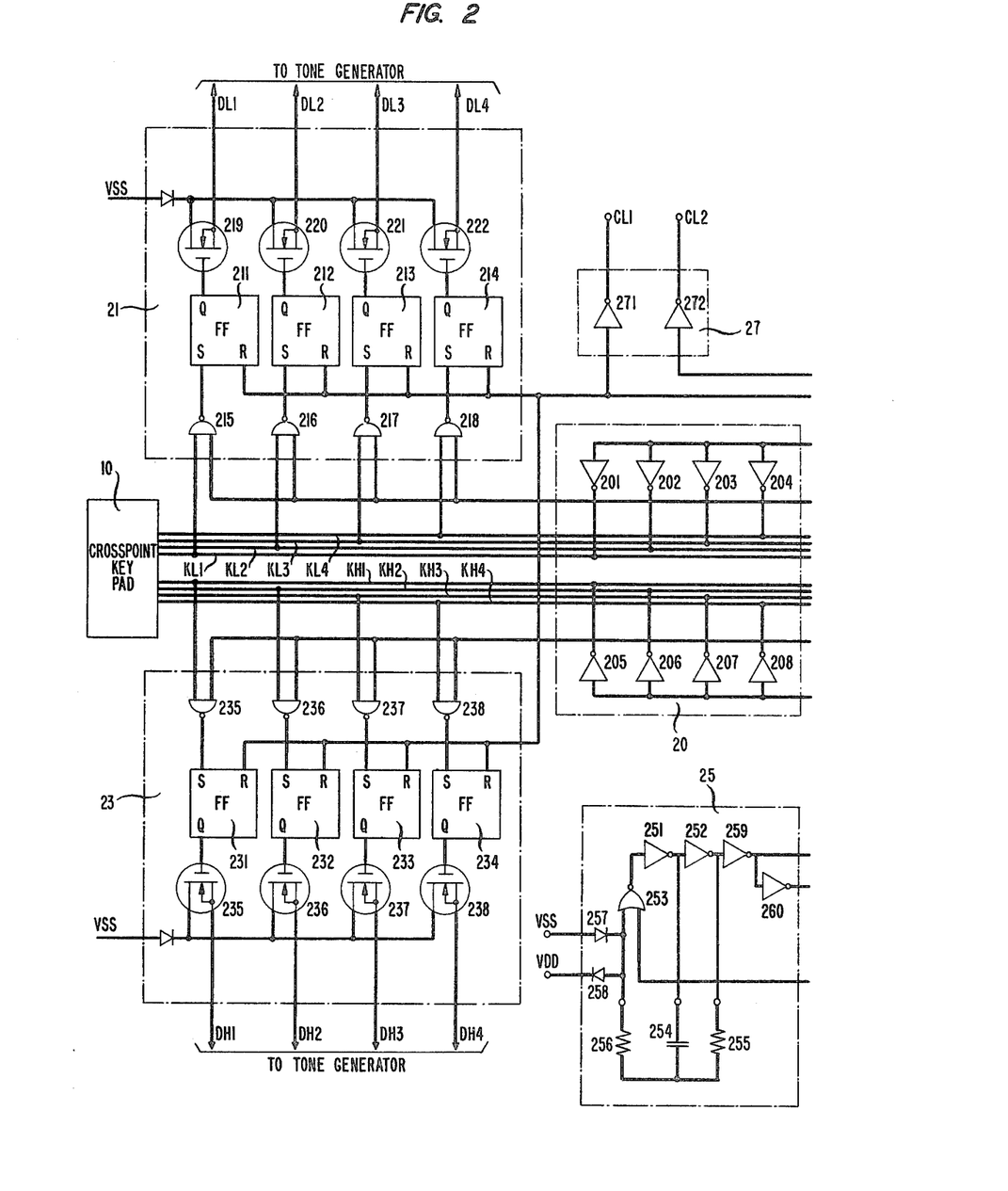
FIGS. 2 and 3 show a detailed schematic of the CMOS logic and frequency switching circuitry employed in this invention.
Figure 3:
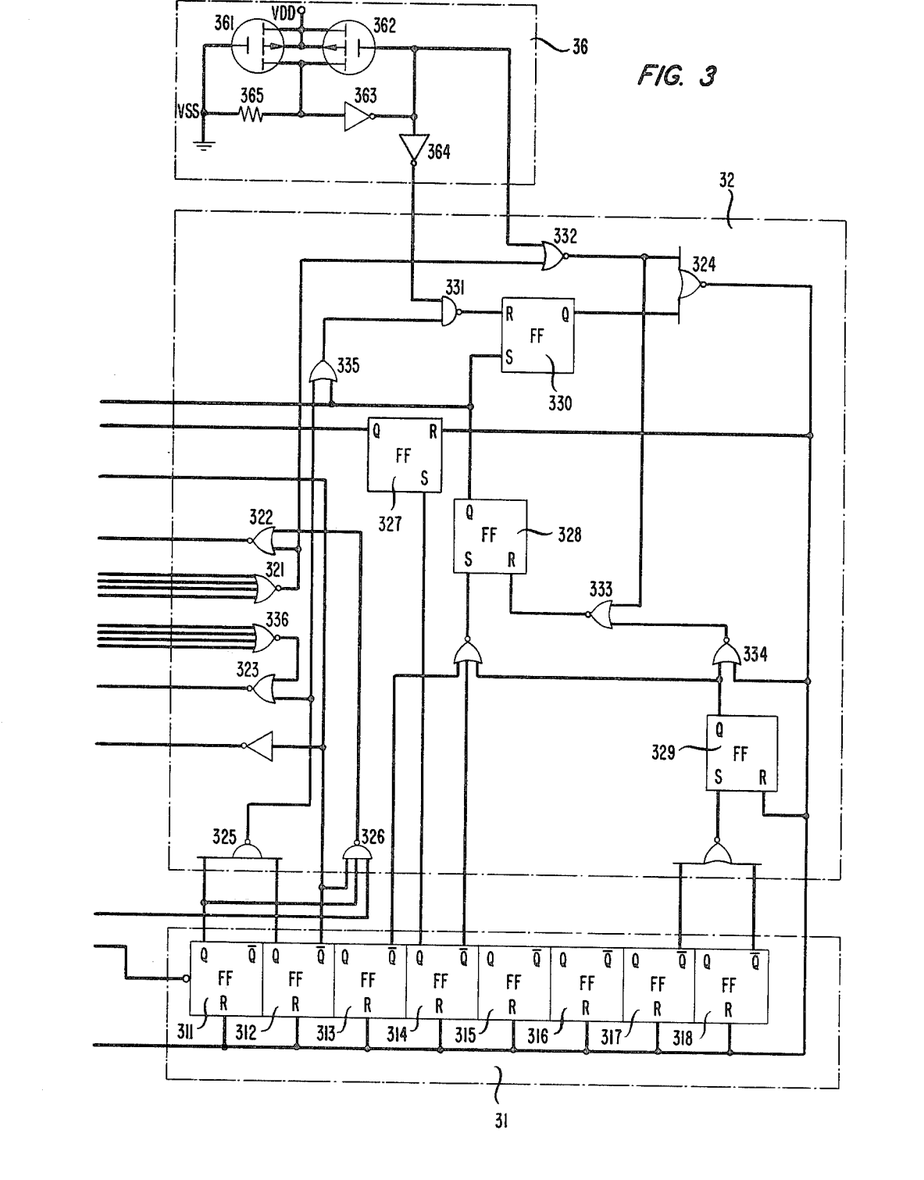

With reference to FIGS. 2 and 3, there is shown an embodiment of the CMOS logic and frequency switching circuit 11 of FIG. 1. It is divided into several identifiable circuit sections which are a keyboard interrogation section 20, a low group frequency latch and switch section 21, a high group frequency latch and switch section 23, a clock section 25, a binary counter section 31, a control circuit section 32, an initiate circuit section 36 and a common logic drive section 27.

Contained within the keyboard interrogation circuitry 20 are eight specially designed inverter gates. Inverter gates 201, 202, 203 and 204 are the low group inverters, and inverter gates 205, 206, 207 and 208 are the high group interverts. These gates have very little ability to sink current in the low state, i.e., less than one-tenth of their ability to source current. The output of the four low group inverters 201, 202, 203 and 204 are connected to leads KL1, KL2, KL3, and KL4, respectively. These leads are designated the low group leads and connect the low group inverters to the keypad 10. The outputs of the four high group inverters 205, 206, 207 and 208 are connected to leads KH1, KH2, KH3, and KH4, respectively. These leads are designated the high group leads and connect the high group inverters to the keypad 10.

In the quiescent state, the logic resides in the speech mode which implies that tone generation is not desired. Moreover, in the quiescent state the outputs of the high group inverters are logic ones and the outputs of the low group are logic zeros. Because the keypad 10 is arranged in a matrix configuration, with the low group leads constituting the rows and the high group leads constituting the columns, whenever a button is depressed on the keypad 10, a connection is made between one of the low group inverter outputs and one of the high group inverter outputs. In addition, since the channel resistance in the n-channel devices used in these special inverter gates is high, the output of the low lead corresponding to the button that is depressed becomes a logic one making it possible to determine which low group frequency has been selected ("test low").

Attached to the low group inverter outputs is a four input NOR gate 321 which signals the control circuitry 32 that a button has been pushed. This causes a sequence of events in the clock 25, counter 31, and control circuitry 32 which leads to changing the input state on both the low and high group inverters. That is, the outputs of the low group become logic ones while the outputs of the high group become logic zeros except for the one tied to a low group output through the keypad 10 ("high"). This makes it possible for the CMOS logic and frequency switching circuit 11 to determine which of the high group frequencies has been selected. The control circuitry 32 alternately continues testing of the low and high groups in the above manner to determine if all buttons are released or if any additional buttons have been depressed.

Contained within the low group frequency latch and switch section 21 are latches 211, 212, 213, and 214. In the high group frequency latch and switch section 23 are latches 231, 232, 233 and 234. The purpose of the latches is to remember which frequency outputs have been selected. This is necessary so that for keypad contacts less than 50 milliseconds in duration, the tone burst that is generated by the tone generator 13 seen in FIG. 1 can still be held ot guarantee a 50 millisecond tone burst. Also, due to the alternating keyboard interrogation scheme, it is necessary to remember which high group leads previously were selected while the low group is being interrogated and vice versa. To ensure that the low frequency latches see the low group inverter outputs only during the low group interrogation periods, NAND gates 215, 216, 217 and 218 are connected to interface between the interrogation circuitry 20 and the latches. While the outputs of the low group inverters are logic ones to interrogate the high group, NOR gate 322 in the control circuitry 32 places a logic zero on the input to all of the low group NAND gates.

During a subinterval while the low group is being interrogated (high group inverters at logic ones), NOR gate 322 places a logic one one one of the inputs of the low group NAND gates. If the other input to any low group NAND gate is connected to an unselected line, the output of the NAND gate does not change and the latch remains in the same state. But if the other input to the NAND gate is connected to a selected line the output of the NAND gate does change and trips its associated latch to the set state if not previously tripped. A similar sequence is used to set the selected high group latches through use of NAND gates 235, 236, 237 and 238 and NOR gates 323 and 336.

Also contained in the low group frequency latch and switch section 21 are frequency switches 219, 220, 221 and 222 respectively connected to lines DL1 through DL4. These are large n-channel IGFETs used to activate the tone generator 13 seen in FIG. 1. Similarly, frequency switches 235, 236, 237, and 238 are contained in the high group frequency latch and switch section 23 are high respectively connected to lines DH1 through DH4 which also connect to tone generator 13. The n-channel is on whenever the output of its associated latch discussed above is in the set state, otherwise it is off. It is in the on state that the n-channel represents a low resistance path from source to drain.

To obtain the required reference time lapse for the binary counter 31 and control circuitry 32, the clock circuit 25 which is basically an astable multivibrator circuit is utilized. During the quiescent state of the control circuit 32 the reset output of NOR gate 324 is at logic one, which when coupled through NOR gate 253 forces the output of inverter 251 to a logic one and the output of invertr 252 to a logic zero, thus preventing oscillation as long as NOR gate 324 is at logic one. When a button on the keypad 10 is depressed, the output of NOR gate 324 becomes a logic zero. Inverters 251 and 252 are thereby free to change state and thus commence oscillation. The oscillation frequency of 3600 Hz is controlled by the R-C time constant of the capacitor 254 and resistor 255 for a first order approximation. Supply voltage variations are minimized by use of resistor 256. Due to NOR gate 253 having diode protectin circuitry (diodes 257 and 258) to protect the gate, there is a secondary effect of its resistance on the period, with some current being discharged through the protection circuitry. Gates 259 and 260 respectively buffer and invert the clock signal to obtain the required phasing for the remaining circuitry.

To obtain the correct sequencing of the CMOS logic and frequency switching circuit the binary counter 31 is utilized. The counter is an eight-state ripple counter in which each stage is triggered to change state by a negative transition (a change from a logic one to a logic zero) in the previous state. The first stage 311 is driven by the clock 25. In the quiescent state, all stages 312 through 318 of the counter 31 are held in the reset state by NOR gate 324 located in the control circuitry 32. When a button on the crosspoint keypad 10 is depressed, the counter 31 is enabled and counts the clock cycles produced by clock 25 thereby performing an elapsed time counting function.

The control circuitry 32 assures internal synchronization and provides the common switch output signals through use of the counts obtained from the binary counter 31. The control circuitry 32 uses the $\overline{Q}$ output level from stage 312 in counter 31 to change the direction of interrogation in the interrogation circuitry 20. By use of NAND gates 325 and 326, and NOR gates 322 and 323, control circuitry 32 allows the frequency latches described above to receive the information on the interrogated leads during the appropriate subinterval.

Also contained within the control circuitry 32 are three elapsed time event markers which are latches 327, 328 and 329. These three latches are forced to a set condition at 8, 12, and 192 clock cycles, respectively. The Q output of latch 327 is coupled via inverter 271 to the common switching circuit 12 to be later described where the switching for the receiver attenuating occurs. Latch 327 is also connected to the reset input of frequency latches 211-214 and 231-234. Once latch 327 is reset (prior to a button push), its output becomes logic zero which resets the frequency latches and causes the output of inverter 271 to go to logic one. When a button is pushed on the keypad 10, latch 327 remains in the reset state until the counter reaches count 8 at which time it is set changing its output to logic one. This allows the frequency latches to be set on subsequent keyboard interrogations and also signals with a logic zero over line CL1 that the receiver should be attenuated.

The Q output of latch 328 is coupled via inverter 272 and over line CL2 to the common switching circuit 12 for control of the transmitter located in the handset 17, for control of the tone generator circuit 13, and for control of the resistance of the network 14. A logic one indicates the transmitter should be one and the tone generator circuit 13 off. Conversely, a logic zero indicates the transmitter should be off or inhibited and the tone generator circuit 13 should be on. The Q output of latch 328 is a logic zero in the reset condition and line CL2 is a logic one.

Latch 328 also controls a pulse stretch circuitry consisting of latch 330 and NAND gate 331. Latch 328 changes to the set state at count 12 setting latch 330 and changing line CL2 to a logic zero. Once latch 330 is set, it simulates the presence of a button push on the keypad 10 by placing a logic one or NOR gate 324 and holding the output of NOR gate 324 at logic zero as if a button were pushed. As previously indicated. the output of NOR gate 324 is a logic one prior to the button push, holding in a reset condition the clock 25, counter 31, latch 327 nd latch 329. When button is pushed the output of NOR gate 321, coupled through NOR gate 332, forces NOR gate 324 to change to a logic zero. If the button is pushed and released before latch 328 is set and therefore before latch 330 is set, the clock 25, counter 31, and latch 327 are immediately reset. This provides a guard against short duration spurious inputs to the interrogation circuitry from eing "streched" by the logic. If the output of NOR gate 321 has remained at logic one until latch 328 is set, however, the assumption is made that a valid button push has occurred and tone generation is desired.

The resetting of latch 328 is controlled by NOR gate 321 and latch 329. NOR gates 333 and 334 require that latch 329 hs been set (which occurs at clock cycle 192) and that the output of NOR gate 321 is a logic zero before latch 328 is reset, the output of inverter 272 changes back to a logic one and latch 330 is a reset when the output of NAND gate 325 goes negative which occurs one clock cycle later.

Proper sequencing of the CL1 and CL2 lines is obtained in the following manner. Assuming a button on the keypad 10 has been pushed for longer than 192 clock cycles, latches 327, 328, 329 and 330 would be set, implying the Q output of each latch would be a logic one. If the button is released during a "test high" period (two clock cycles long), the KL1 to KL4 leads will be logic ones, making the output of NAND gate 321 a logic zero until the "test low" (also two clock cycles long). If the button is released during the "test low" period, the output of NAND gate 321 will remain at logic zero until the button is released. Thus the output of NAND gate 321 can change to a logic one from either the beginning of a "test Low" period to very near the end, a variation of two clock cycles. Once the output of NAND gate 321 has changed to a logic one, the output of NOR gate 332 changes to a logic zero. Since latch 329 is set, the output of NOR gate 334 is logic zero. This makes both inputs to NOR gate 333 logic zeros, and its output a logic one which resets latch 328 and changes line CL2 to a logic one.

The output of NAND gate 325 is a logic one except for a subinterval of the "test high" period. During this subinterval in the "test high" period, both inputs of OR gate 335 will be logic zeros, making the output NAND gate 331 a logic one and resetting latch 330. Since this is during a "test high" period, the output of NOR gate 322 is a logic one and the output of NOR gate 324 remains a logic zero. At the beginning of the next "test low" period the output of NOR gate 324 immediately resets the counter 31 and latches 327 and 329 change line CL1 to a logic one. If th button is released before the 192nd clock cycle, the sequence is similar to the button being released during a "test high" period, nd four full clock cycles occur between line CL2 changing back to a logic one and line CL1 changing to a logic one. The clock frequency of 3600 Hz ensures that 180 clock cycles correspond to 50 milliseconds.

The above-described logic ensures the following: (1) line CL2 will be at logic zero for at least $192-12=180$ clock cycles, (2) that as long as the button is depressed beyond the 192nd cycle, line CL2 will remain at logic zero, and (3) that after the button is released, line CL2 will change to a logic one from two to four clock cycles ahead of line CL1 changing back to a logic one.

In accordance with the invention, power to the signal generator is provided by coming off hook on the telephone line. When power is applied, an initiate circuit 36 provides a pulse allowing the control circuit 32 to be set in the quiescent state. The pulse is designed to be at least seven gate propagation delays long to ensure proper setting up of the logic. The initiate circuit 36 consists of two p-channel devices 361, 362, two standard inverters 363, 364, and a resistor 365 that in combination provide the pulse when the power supply voltage starts at zero and increases with time to the operating level. The outputs of all gates are undefined if the supply voltage is less than the gate threshold. The gate threshold for the p-channel devices is slightly greater than the gate threshold for the n-channel devices in the CMOS logic and frequency switching circuit 11. Thus when the power supply voltage has exceeded the gate threshold of the p-channel devices, all outputs will be defined and ready for the initiate pulse.

As the power applied to the initiate circuit 36 increases to the level where the p-channel device threshold is barely exceeded, both p-channel devices 361 and 362 still have channel resistances much larger than the resistor 365. The input to inverter 363 will thus be a logic zero forcing the output of inverter 363 to a logic one, which in turn keeps the second p-channel device 362 turned off. The first p-channel device 361 has its gate tied to the logic zero reference, thus turns on harder as the power supply voltage increases. Eventually the channel resistance of the first p-channel device 361 becomes lower than the resistance of resistor 365, forcing inverter 363 to change state when its input becomes the equivalent of a logic one level. The second p-channel device 362 immediately turns on, and causes the input level for the inverter 363 to go even higher to a stronger logic one.

The power supply voltage at which the output of inverter 363 changes from logic one to logic zero is the minimum operate voltage of the CMOS logic. Two p-channel devices are used so that after the initiate circuit 36 is above the minimum operate voltage, a small dip of short automatically reset. For example, when the circuit is above the minimum operate voltage, inverter 363 has a logic zero at its output and both p-channel devices 361 and 362 are on. For the input of inverter 363 to become a logic zero and thus cause undesirable resetting of the logic, the parallel resistance of both p-channel devices 361 and 362 must exceed the resistance of resistor 365, which necessarily is at a lower power supply voltage than when the first p-channel device's resistance caused the input of inverter 363 to chanbe to a logic one during the power-up period. The difference in supply voltage that causes the output of inverter 363 to change from a logic one to a logic zero during the power-up period and the output of inverter 363 to change from a logic zero to a logic one during a power-down period is the margin range wherein which the logic cannot inadvertently reset.

Figure 4:
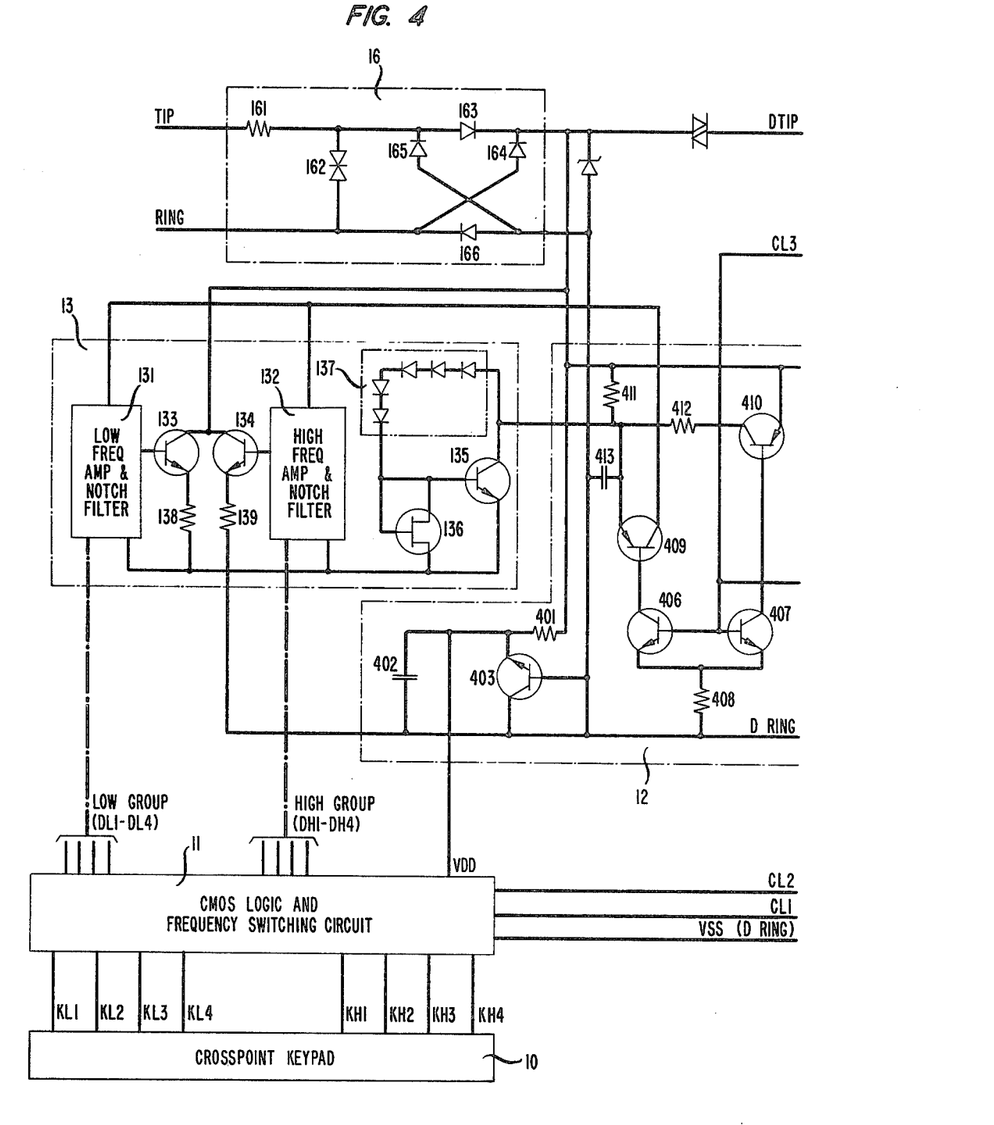
FIGS. 4 and 5 present a schematic diagram showing the detailed circuitry of the common switch circuit and its interconnections with the other components in the electronically-switched generator.
Figure 5:
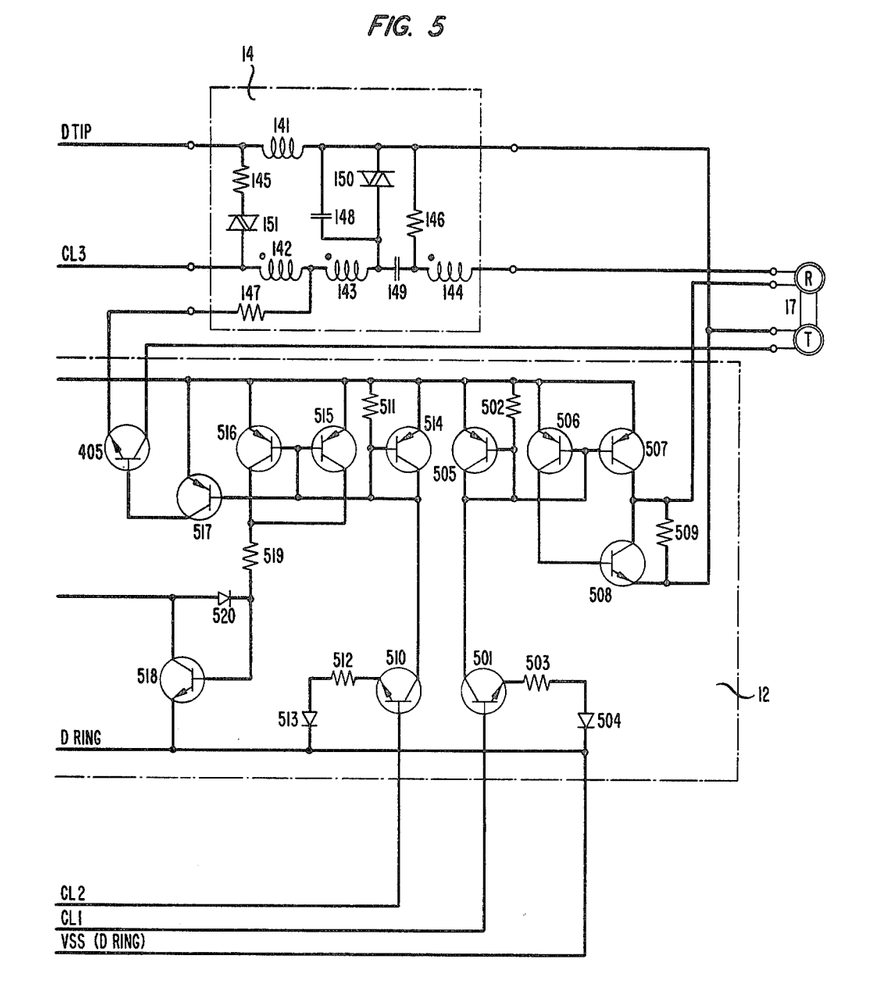
Figure 6:
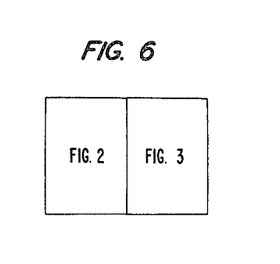
FIG. 6 illustrates the arrangement of FIGS. 2 and 3.
Figure 7:
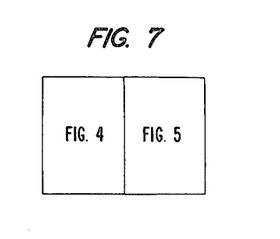
FIG. 7 illustrates the arrangement of FIGS. 4 and 5.

Referring now to FIGS. 4 and 5, there is shown the detailed circuitry of the common switch and its interconnections with the other circuits in the electronically-switched multifrequency generator for tone signaling telephones.

Known in the telephone art are the speech network 14, the polarity guard 16, and handset 17 which ar included to show an illustrative connection between a tone signaling telephone in accordance with the invention and the tip and ring terminals of a telephone line. The speech network 14 is used primarily in the telephone art to separate transmit and receive signals. The components therein are the hybrid coil with the windings 141 through 144, the resistors 145 through 147, the capacitors 148 and 149, and the varistors 150 and 151. The polarity guard and surge protection circuit 16 ensures that the correct voltage polarity is provided for the circuitry of the invention irrespective of the voltage polarity present on the tip and ring lines, and further protects the circuitry against high voltage surges that might be impressed upon the lines. The components contained therein are surge resistor 161, surge protection diode 162 and polarity guard diodes 163 through 166. The handset 17 includes a transmitter and a receiver.

Also known in the telephone art is the tone generator 13 which incorporates the art described in U.S. Pat. No, 3,699,477 issued to L. J. McKell on Oct. 17, 1972 and U.S. Pat. No. 3,720,886 issued to P. Zuk on Mar. 13, 1973. The function of the circuit components within the tone generator are thus known and are not described herein. The principal components include a low frequency amplifier and notch filter 131 and an associated transistor 133 and a resistor 138, a high frequency amplifier and notch filter 132, and an associated transistor 134 and a resistor 139, and a regulator section comprising transistors 135 and 136 and a diode string 137.

The circuitry of the invention comprises the above-known sections operably interconnected with the CMOS logic and frequency circuit 11, the crosspoint keypad 10, both of which are previously described, and a common switching circuit 12 to be described in detail hereinbelow.

The function of each of the circuit elements in the common switching circuit 12 may best be presented in terms of a description of the circuit in changing between speech and dial modes of operation. The common switching circuit 12 contains five transistor switches which are necessary in selecting between speech and dil modes of operation. The transistors are turned on to approximate a closed contact and off to approximate n open contact. In order for the common switch circuit not to cause degradation of the transmission performance, current mirror current sources with very high output impedances are used for forcing the switching transistors into saturation to perform the switching function. Some examples of current mirror current sources are seen in U.S. Pat. No. 3,936,725 issued to H. A. Schneider on Feb. 3, 1976 and U.S. Pat. No. 3,952,252 issued to O. H. Schade, Jr. on Apr. 20, 1976. In these current sources, the output current magnitude is substantially independent of both the voltage impressed across the current source and the impedance presented thereto.

The common switching circuit 12 realizes its operating power directly from the DTIP and DRING lines which have both an ac component and dc component present. A filtered dc current drive for the common switching circuit 12 is obtained through the use of resistor 401 and capacitor 402 which constitute a divider network that shunts the DTIP and DRING lines. Resistor 401 and capacitor 402 comprise a frequency dependent filter that prevents the ac component on the telephone line from being attenuated while attaining operating power from the dc component also on the telephone line. The resistor 401 presents a high impedance value to the speech signal and the cpacitor 402 has a relatively low impedance shunt value to filter out any speech or ac signals present at their common node point. This filtered dc is used to vary the current drive with the dc level on the line and not with the ac level on the line. The dc current drive to the common switching circuit 12 is therefore primarily afunction of the voltage across the VDD and DRING lines. Since the voltage on the VDD line will change as a function of loop length, the drive current available to the common switching circuit 12 will also change as a function of loop length.

The dc potential at the junction of resistor 401 and capacitor 402 is also coupled over the VDD line to the CMOS logic and frequency switching circuit 11 to provide power therefor. Returning from the CMOS logic and frequency switching circuit is a logic one voltage level on both the CL1 and CL2 lines containing the drive current for the common switching circuit 12. This logic one appears when the multifrequency generator is in the speech mode of operation. Also connected between the common node point of resistor 401 and capacitor 402 and the VDD line is transistor 403 which serves as a zener diode preventing the voltage rom becoming too high for the CMOS logic and frequency switching circuit 11 for the short loop condition. It is not activated, however, for medium and longer loops.

In the speech condition a logic one is coupled from the CMOS logic and frequency switching circuit 11 over the CL1 line to the base of transistor 501 causing it to conduct. Transistor 501 operates as a current source with its emitter connected to DRING through the series connection of the resistor 503 and diode 504. Current appearing at the collector terminal of transistor 501 is used to drive a current mirror consisting of transistors 505, 506 and 507 and resistor 502. The size of these transistors is such that the collector current in transistor 506 is the same as the collector current in transistor 505. Collector current in transistor 507 is about three times that of the collector current in transistor 505. Transistor 505 carries the reference current which is the same as that in transistor 501. Since the collector of transistor 506 is connected to the base of transistor 508, and the collector of transistor 507 with three times the collector current of transistor 506 is connected to the collector of transistor 508, transistor 508 is forced thereby into a drive-saturated condition. The collector-emitter junction of transistor 508 is in series with the receiver located in handset 17 and comprises a switch for the receiver. Thus, in the on condition, speech signals from the speech network 14 readily pass through the transistor 508 to the receiver in handset 17.

Although a collector current is forced onto transistor 508 to obtain a better switching characteristic therefrom, the dc current through the receiver remains at zero. This is due to the potentials of the emitter and collector of transistor 508 being essentially at the same level. There is, therefore, no need to vary the receiver drive as a function of loop length since without dc current in the receiver, impedance through transistor 501 can still be maintained at a low level.

In the dial condition, the CMOS logic and frequency switching circuit 11 places a logic zero on line CL1, thus turning off transistor 501. Since current is inhibited from flowing through transistor 501 in the off condition, transistors 505, 506, and 507 are also turned off. With transistors 506 and 507 turned off, no current is supplied to transistor 508 turning it oss as desired during dialing. Once these transistors are turned off, only a very small lekage current can flow from DTIP to DRING. The receiver current drive sources thus allow the ac signal to be present on DTIP and DRING lines without causing any significnt attenuation or loading of the ac signals. Resistor 509 is connected in parallel with the collector-emitter junction of transistor 508 so that when the transistor 508 is turned off, a small amount of the signal produced in the tone generator will flow throught the resistor 509 and to the receiver within the handset 17, thus allowing for the tone to be heard while being generated.

In the speech mode condition, a logic one is coupled from the CMOS logic and frequency switching circuit 11 over the CL2 line to the base of transistor 510 causing it to conduct. Transistor 510 is bridged across the DTIP and DRING lines with its collection serially connected to DTIP Through a current mirror consisting of transistors 514 through 517 and resistor 511. Its emitter is connected to DRING through the series connection of resistor 512 and diode 513. Operating as a current source, transistor 510 is used to drive transistor 514 through 517. These transistors form the current mirror circuit such that a collector current of transistor 515 is equal to the collector current of transistor 514 and the collector currents of transistors 516 and 517 are three times the collector current of transistor 514, the collector of transistor 514 being equal to the collector current of transistor 510.

The transistors 514 and 517 are used to develop a current gain necessary to drive transistor 405 into saturation. The collector-emitter junction of transistor 405 is in series with a transmitteer located in handset 17 and comprises the switch which disables the transmitter during dialing. The switching of transistor 405 is thus provided without unacceptable shunt degradation of the speech signals through use of the combination of transistor 510, a high impedance current source, driving the current mirror section consisting of trnsistors 514 and 517.

The current mirror section consisting of transistors 514, 515, and 516 are used to develop the current gain to drive into saturation transistor 518 which when activated keeps the tone generator 13 in the standby condition and the voltage appearing across the DTIP and DRING lines to an acceptable level in the speech mode. Drive current from the collector of both transistors 515 and 516 are commonly coupled through resistor 519 to the base of transistor 518 providing a base drive therefor. One reference current comprising the collector current from transistor 510 to the current mirror is therefore used to drive both transistors 405 and 518. The reference current is about one-fourth of transistor 518 base drive and one-third of transistor 405 base drive. Thus, a saving of power is obtained by using only one reference for transistors requiring different drive levels.

When the CMOS logic and frequency switching circuit 11 switches to the dial mode condition, a logic zero is placed on the CL2 line causing transistor 510 to turn off. No current is thus available from the collectors of transistors 515, 516, and 517. Without base current drive, transistor switch 405 is turned off disconnecting the transmitter within handset 17 as is desired during tone generation.

The current that flows in the network 14 and the handset 17 from the DTIP line flows over the CL3 line and through the collector-emitter junction of transistor 518 to the DRING line. In order to ensure recognition by the central office of an off-hook condition of the tone signaling telephone, a sufficient current level must be drawn from the central office over the TIP and RING lines. To allow for more current to flow in the speech condition, the impedance between the DTIP and the DRING lines is kept to that of the impedance network 14 by driving transistor 518 into saturation by transistors 515 and 516. Inn the dial condition, however, additional voltage is desirable and the impedance across the DTIP and DRING lines is increased. When transistors 515 and 516 are turned off, transistor 518 tends to turn off also. But the potential on line CL3 rises and causes diode 520 to conduct. Base current is thus provided to transistor 518 keeping it turned on but not saturating it. Line CL3 therefore increases an additional potential of two $V_{BE}$ (the voltage drops across diode 520 and the base-emitter junction of transistor 518). This has the effect of raising the DTIP line by approximately the same amount giving the tone generator 13 an additional two $V_{BE}$ of voltage which is needed for proper operation but otherwise would not be available on the long loop length low current condition.

As the line CL3 increases up two $V_{BE}$, another effect is that two current sinks are established in transistors 406 and 407. This is possible since at this time, resistor 408 has a voltage across it that is approximately equal to one $V_{BE}$, whereas in the speech mode when transistor 518 is saturated, it has very little voltage across it and therefore very little current flowing through it. These high impedance current sinks are set up in the dial mode in transistors 406 and 407 for turning on transistor 409 and 410, respectively. The purpose of using current sinks is the same as for using current sources, i.e., the prevention of signal degradation on the DTIP and DRING lines. In the dial mode, this signal of interest is the tone signals that are present on the DTIP and DRING lines.

The main source of power for the tone generator 13 is provided by switching transistor 409 which has its collector connected to the low frequency amplifier and notch filter 131 and the high frequency amplifier and notch filter 132. Its base connected to the collector of transistor 406, transistor 409 begins to conduct when transistor 406 turns on as previously indicated. Voltage to the emitter of transistor 409 is provided from the DTIP line through resistor 4121 when the tone generator 13 is in the standby mode. While in the speech mode condition, resistor 411 also provides a current path for charging capacitor 413 without unacceptably lowering the speech signal levels. When tone generation is commenced, the charge on capacitor 413 provides the voltage necessary for immediate tone generation by the tone generator 13.

The value of resistor 411 is too large a resistance, however, to allow the flow of sufficient current for the amplifiers in the tone generator 13 since the tone generator 13 requires more current when it is generating tone than when it is in the standby mode. Transistor 410 thus provides the required switching that allows more current to flow for operation of the tone generator 13 while in the dial mode. Resistor 412 being of a lower value than resistor 411 is switched in parallel with resistor 411 by the turning on of transistor 410. Current then flows from the DTIP line through the emitter-collector junction of transistor 410 and resistor 412 to the register section of the tone generator 13 and through the emitter-collector junction of transistor 409 to the amplifiers of tone generator 13.

To avoid undesirable clicks in the receiver of the handset 17 during changes between the dial and speech condition, when a button is pushed commencing tone generation, the CMOS logic and frequency switching circuit 11 causes the CL1 line to go to a low state, attenuating the receiver approximately 1.1 milliseconds before it causes the CL2 line to go to a low state. After the button is released, which indicates a return to the speech condition, the CMOS logic and frequency switching circuit 11 causes the CL1 line to return to the high state from 0.5 to 1.2 milliseconds after the CL2 line has returned to the high state. The receiver will therefore always be muted before the transmitter is disconnected, the line impedance changed and power to the tone generator 13 is provided. With the cessation of tone generation, the sequencing is reversed in that the receiver is reactivated only after the other functions have been reinstated.

Although a specific embodiment of the invention has been shown and described, it will be understood that it is but illustrative and that various modifications may be made therein without departing from the scope and spirit of this invention as defined in the appended claims.

I claim:

1. A multifrequency generator for providing tone signaling comprising:
    a control circuit (11);
    a tone generator (13) for providing the tone signaling in response to control signals provided by the control circuit; and
    a common switching circuit (12) comprising a series of solid-state switching devices (405, 409, 410, 508, and 518), each of the solid-state switching devices being controlled by the control circuit characterized in that
    the common switching circuit includes at least one current source (505-507) that provides a high impedance activation signal to the solid-state switching devices.

2. The generator as in claim 1 wherein the common switching circuit includes at least one current sink (406 and 407) that provides a high impedance activation signal to the solid-state switching devices.

3. A multifrequency generator for providing tone signaling in a telephone including a transmitter and a receiver (17) and a network (14) for separating transmit and receive signals, the generator comprising:
    a control circuit (11);
    a tone generator (13) for providing the tone signaling in response to control signals provided by the control circuit;
    a keypad (10) for activating the control circuit; and
    a common switching circuit (12) comprising a series of solid-state switching devices (404, 409, 410, 508 and 518), each of the solid-state switching devices being controlled by the control circuit CHARACTERIZED IN THAT
    the common switching circuit includes switching means activated in response to operation of the keypad which increases the voltage available to the tone generator by increasing the resistance of the network during the tone signaling by the tone generator.

4. The generator as in claim 3 wherein the control circuit (11) and the common switching circuit (12) in combination activate switching means for attenuating the receiver and disconnecting the transmitter (17) and providing power to the tone generator (13), the attenuating of the receiver occurring prior to disconnecting the transmitter, prior to increasing the resistance of the network and prior to providing power to the tone generator.

5. The generator as in claim 3 wherein the control circuit (11) and the common switching circuit (12) in combination activate switchin gmeans to remove attenuation from the receiver and activate the transmitter (17), decrease the resistance of the network (14) and remove power from the tone generator (13), the removal of attenuation from the receiver occurring after activating the transmitter, after decreased the resistance of the network and after removing power from the tone generator.

6. The generator as in claim 3 wherein, upon the operation of a key on the keypad (10) for greater than a first predetermined time period and less than a second predetermined time period, the control circuit (11) causes the tone generator (13) to generate a tone burst with a duration of that second time period.

7. The generator as in claim 6 wherein the control circuit (11) includes a counter having a given number of stages (311-318), the input of the first stage coupled to the output of a clock (25), a first latch (328) coupled to the output of the counter for initiating the tone burst upon attaining a first given count, a second latch (330) coupled to the output of the first latch, a first NOR gate (324) coupled to the output of the second latch and to the output of a second NOR gate (332) for holding the first NOR gate in a set position while generating the tone burst, a third latch (329) coupled to the counter for providing an output upon the counter attaining a second given count, a third NOR gate (334) coupled to the output of the third latch and to the output of the first NOR gate, a fourth NOR gate (333) coupled to the output of the third NOR gate and to the output of the second NOR gate, the first latch coupled to the output of the fourth NOR gate for terminating the tone burst.

8. The generator as in claim 4 wherein the common switching circuit (12) includes receiver attenuating means for muting the output of the receiver (17). The receiver attenuating means further includes a transistor current source (501) coupled between a reference potential and a current mirror (505-507) connected to a more positive potential, the current mirror being used to drive the receiver attenuating means.

9. A generator as in claim 8 wherein the current mirror comprises three transistors (505, 506, 507), the first transistor (505) providing the reference current for the second transistor (506) and third transistor (507), the second transistor having a current drive equal to that of the first transistor and having its collector connected to the base of a fourth transistor (508) which comprises the receiver switch, the third transistor having a current drive equal to three times that of the first transistor and having its collector connected to the collector of the fourth transistor, the second transistor and third transistor when activated combining to place the fourth transistor in a low impedance condition so that ac signals freely pass therethrough from the collecto to the emitter junction, and when the second transistor and third transistor are deactivated a high impedance condition is presented across the collector to emitter junction of the fourth transistor attenuating the ac signals present.

10. The generator in claimm 4 wherein the common switching circuit (12) includes transmitter disconnecting means for disconnecting the output of the transmitter (17). the transmitter disconnecting means further includes a transistor current sorce (510) connected between a reference potential and a current mirror (514-517) connected to a more positive potential, the current mirror being used to drive the transmitter disconnecting means.

11. The generator as in claim 10 wherein the current mirror comprises four transistors (514, 515, 516, 517), a first transistor (514) which provides the reference current for a second transistor (517), a third transistor (515) and a fourth transistor (516), the second transistor having a drive current level of three times that of the first transistor and having its collector connected to the base of a fifth transistor (405) which when activated provides a low impedance dc current path for the transmitter through its collector-emitter junction and when deactivated presents a high impedance dc current path for the transmitter over the collector-emitter junction.

12. The generator as in claim 11 wherein the third transistor (515) has a current drive level equal to that of the first transistor (514) and the fourth transistor (516) has a current drive level equal to three times that of the first transistor (514), the collector of the third transistor and the collector of the fourth transistor being commonly connected through a resistor (519) to the base of a sixth transistor (518) to provide drive current therefor, providing switching means for controlling the tone generator (13) and increasing the resistance of the network (14).

13. The generator in claim 12 wherein the switching means for increasing the resistance of the network (14) includes a diode (520) with its anode connected to the collector of the sixth transmitter (518) and its cathode connected to the base of the sixth transistor, the diode providing drive current for the sixth transistor after the third and fourth transistors (515, 516) are inhibited from providing drive current to the base of the sixth transistor.

14. The generator as in claim 4 wherein the common switching circuit (12) includes tone generator activation means for activating the tone generator (13). the tone generator activation means further includes a fist transistor current sink (407) and a second transistor current sink (406).

15. The generator as in claim 14 wherein the first transistor current sink and the second transistor current sink have their emitters commonly connected to a reference potential through a resistor (408), the first transistor has its collector connected to the base of a third transistor (410) which provides a portion of the switching function for activating the tone generator (13), the third transistor has its emitter connected to a more positive potential in parallel with a first resistor (411) and its collector serially connected to a second resistor (412) that connects in parallel relationship to the first resistor, the combination providing a high-low current drive to the tone generator and to the emitter of a fourth transistor (409), the second transistor has its collector connected to the base of the fourth transistor which provides the remainder of the switching function for activating the tone generator and has its collector connected to the tone generator.

16. A multifrequency generator for providing tone signaling in a telephone including a transmitter and a receiver (17), a tone generator (13), and a network (14)

for separating transmit and receiver signals, the generator comprising:
 a control circuit (11);
 a common switching circuit (12) comprising a series of solid-state switching devices (405, 409, 410, 508 and 518), each of the solid-state switching devices being controlled by the control circuit (11)
 the control circuit and the common switching circuit in combination activate switching means for attenuating the receiver, disconnecting the transmitter, and providing power to the tone generator, the attenuation of the receiver occurring prior to disconnecting the transmitter and prior to providing power to the tone generator;
 the control circuit and the common switching circuit in combination activate switching means to remove attenuation from the receiver, activate the transmitter, and remove power from the tone generator, the removal of attenuation from the receiver occurring after activating the transmitter and after removing power from the tone generator.

17. The generator as in claim 4 or 5 or 16 wherein the control circuit (11) includes a counter having a given number of stages (311–318), the input to the first stage coupled to the output of a clock (25), a plurality of NAND gates (325, 326) each coupled to the counter for providing an output upon attaining a given count, a plurality of NOR gates each coupled to the ripple counter to provide an output upon attaining a given count, a first latch (329) coupled to the output of a first one of the plurality of NOR gates and to the output of a first NOR gate (324), a second NOR gate (334) coupled to the output of the first latch and to the output of the fist NOR gate, a third NOR gate (333) coupled to the output of the second NOR gate and to the output of a fourth NOR gate (332), a second latch (330) coupled to the output of a third latch (328) and to the output of a first NAND gate (331), the third latch coupled to the output of a second one of the plurality of NOR gates, a fourth latch (327) coupled to the output of the counter for providing an output upon attaining a given count and to the output of the first NOR gate, a first inverter (271) coupled to the output of the fourth latch for providing a signal to the common switching circuit (12) for controlling the state of the receiver, and a second inverter (272) coupled to the output of the third latch for providing a signal to the common switching circuit for controlling the transmitter, the resistance of the network (14), and power to the tone generator (13).

18. A multifrequency generator for providing tone signaling in a telephone including a transmitter and a receiver (17) and a network (14) for separating transmit and receive signals, the generator comprising:
 a control circuit (11);
 a tone generator (13) for providing the tone signaling in response to control signals provided by the control circuit;
 a keypad (10) for activating the control circuit; and
 a common switching circuit (12) comprising a series of solid-state switching devices (405, 409, 410, 508 and 508), each of the solid-state switching devices being controlled by the control circuit
 upon the operation of a key on the keypad (10) for greater than a first predetermined time period and less than a second predetermined time period, the control circuit (11) causes the tone generator (13) to generate a tone burst with a duration of that second time period.

* * * * *